United States Patent [19]
Kopelman

[11] Patent Number: 5,995,350
[45] Date of Patent: Nov. 30, 1999

[54] TEMPERATURE CONTROLLED CIRCUIT INTERRUPTER

[76] Inventor: Robert Z. Kopelman, 250 N. Village Ave. #C23, Rockville Center, N.Y. 11570

[21] Appl. No.: 09/104,455

[22] Filed: Jun. 24, 1998

[51] Int. Cl.⁶ .................................................. H02H 5/00
[52] U.S. Cl. ........................................ 361/103; 361/115
[58] Field of Search ................................ 361/103–106, 361/115; 337/103, 113

[56] References Cited

U.S. PATENT DOCUMENTS

| | | | |
|---|---|---|---|
| 4,903,162 | 2/1990 | Kopelman | 361/103 |
| 5,262,749 | 11/1993 | Kopelman | 337/103 |
| 5,541,803 | 7/1996 | Pope, Jr. et al. | 361/103 |

*Primary Examiner*—Stephen Jackson
*Attorney, Agent, or Firm*—Goldstein & Canino

[57] ABSTRACT

A temperature sensitive circuit interrupting arrangement includes a temperature controlled relay that will open to disconnect a load, such as a common household appliance or utensil, from a power source when the amount of heat produced by any one of a plurality of electrically conductive items coupling power from the power source to the load causes a sensed temperature to rise above a pre-determined safety limit temperature. The rise in the sensed temperature may be due to a poor (resistive) contact, an over-current condition due to a malfunction of the load, or other common causes. The circuit interrupting arrangement may be incorporated in many forms of electrical devices including male plugs, female sockets, switches, dimmers, multi-outlet power strips, power cords, and ground fault interrupters.

18 Claims, 4 Drawing Sheets

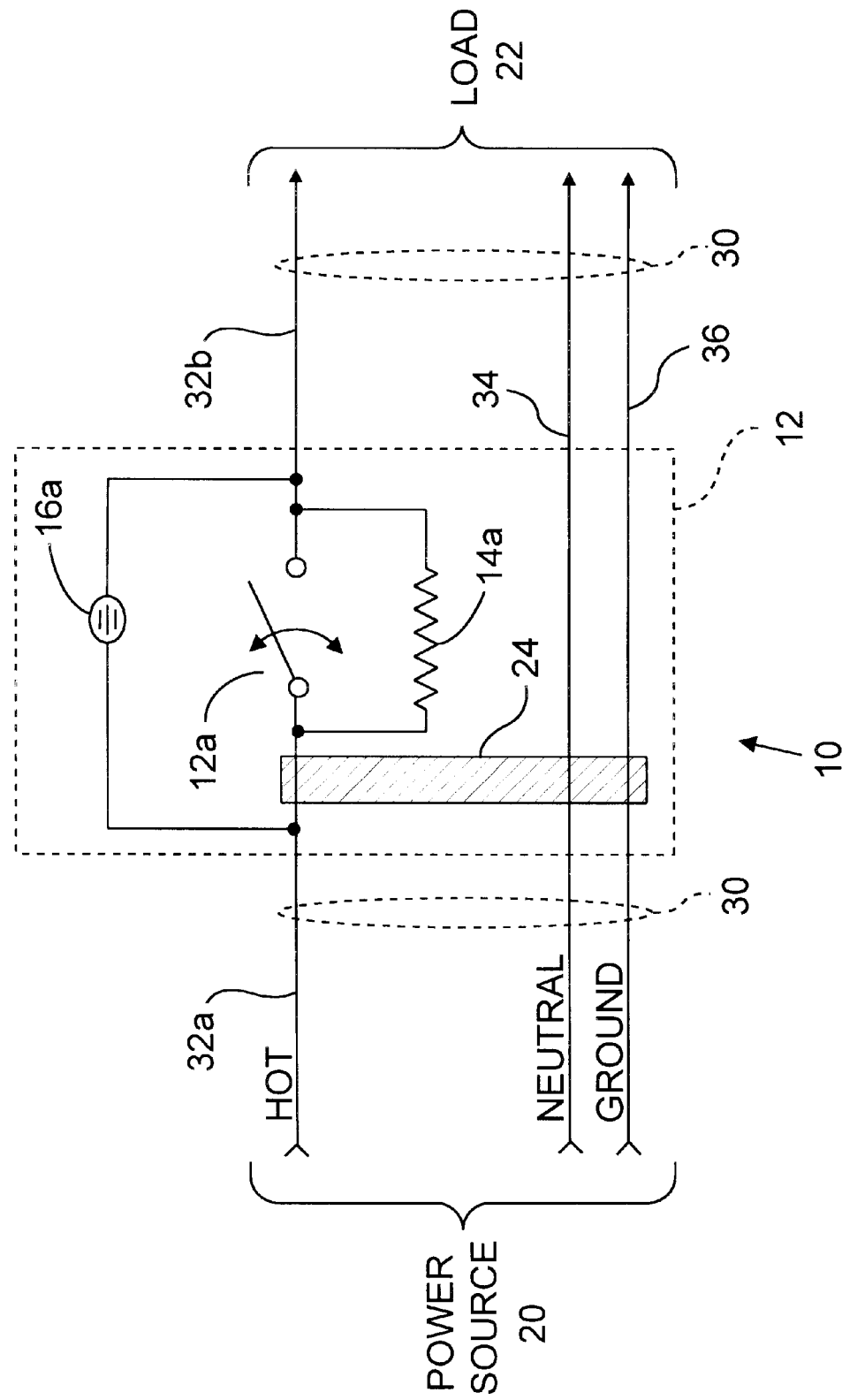

TEMPERATURE CONTROLLED CIRCUIT INTERRUPTER

CROSS REFERENCE TO RELATED APPLICATIONS

The subject matter of this application is related to U.S. Pat. No. 4,903,162, issued on Feb. 20, 1990, and U.S. Pat. No. 5,262,749 issued on Nov. 16, 1993.

BACKGROUND OF THE INVENTION

1. Field of the Invention

The present invention relates to an electrical safety device. More particularly, the invention relates to a temperature sensitive and controlled circuit breaking device that is arranged to electrically disconnect a load from a power source with the occurrence of an over-temperature event associated with the delivery of power from the power source to the load.

2. Background and Objects of the Invention

The cross-referenced patents listed above to Kopelman disclose safety devices that will monitor the current flowing through a hot or supply conductor, essentially via a sensed temperature (associated with the current flow). The devices are configured with a temperature sensitive relay (and or over-current sensitive device) that is operable between a closed position or closed state when the relay is sufficiently cool, and an open position or open state when the temperature of the relay, or equivalently packaging the relay is housed in, is above a predetermined limit temperature. An over-temperature event of these devices may require manual resetting to again enable power to be coupled to a load, or alternately, may reset automatically by sufficient radiational cooling (over a sufficient temporal period). Each of the cross referenced patents, as listed above, is hereby incorporated herein by reference.

However, in the preferred embodiments of the above discussed inventions, the temperature controlled relay may only be electrically and or mechanically coupled to a 'hot' or power sourcing conductor. Accordingly, there is a possibility that heat generated by other conductors (or related structures and current carrying means) may not be appropriately sensed due to their physical location and possibly due to the nature of the electrical connections of the temperature controlled relay. It is important to understand that when referring to the sensing of heat produced by the flow of current (possibly due to an excessive 'over-current'), such sensing may be realized in several possible ways. Namely, either by indirect thermal conduction through convection or heat flow through a non-current carrying thermal conductor (say via a suitable thermal conduction means, such as air or an appropriate potting material) or through a direct coupling (say via the thermal conduction along an electrical conductor or one or more metal parts such as a plug prong).

Therefore, when considering prior art circuit interrupters, there is currently lacking a simple and cost effective arrangement to thermally sense and monitor the heat produced by any of a plurality of current carrying means (e.g., wires, conductors, etc.) to determine if the temperature of any one of said means has risen above a predetermined limit. For example, an elevated temperature level may be caused by a poorly formed resistive contact and or an excessive current flow of a neutral conductor or even a ground conductor.

Objects of the present invention are, therefore, to provide new and improved temperature controlled circuit interrupters having one or more of the following capabilities, features, characteristics, or advantages:

- arranged to effect the coupling of a load to a suitable power source, or alternately, to disconnect the load from the power source should an 'over-temperature' (and or over-current) event associated with the delivery of power from the power source to the load occur;
- employs at least one temperature controlled relay, possibly employing temperature sensitive 'bi-metal' heat (and or current) responsive contact means;
- configurable as self or automatic resetting interrupters, or alternately, may be arranged to require manual resetting;
- resetting of the interrupter may be effected by disconnecting the power source for a sufficient temporal period to effect suitable cooling of the temperature controlled relay, thereby causing the resetting of the circuit interrupter;
- may employ a position and proximity arrangement to enable the temperature controlled relay (via air and convection) to be thermally coupled to a portion of each of a plurality of the current carrying conductors (and or other current carrying means) to sense an over-temperature event (due to the heating of any of a number of the current carrying means);
- may employ a volume of a thermally conductive potting material, or a functional equivalent, to thermally couple at least a portion of each of a plurality of the current carrying conductors (and or other current carrying means) to the temperature controlled relay for sensing thereby;
- may be employed with 2 pole/single phase power sources or multi-pole/multi-phase power sources;
- configurable as self-contained, compact, in-line devices, such as plugs, (duplex) outlet sockets, switches, dimmers, multi-outlet power strips, cords, etc.; and
- simple low cost embodiments using many off-the shelf components.

The above listed objects, advantages, and associated novel features of the present invention, as well as others, will become more apparent with a careful review of the description and figures provided herein. Attention is called to the fact, however, that the drawings and the associated description are illustrative and exemplary only, and variations are certainly possible.

SUMMARY OF THE INVENTION

In accordance with the present invention a heat sensing, temperature controlled, circuit interrupter is provided to enable a load to be selectively coupled to or disconnected from a power source in accordance with a sensed temperature associated with electrically conductive means. The sensed temperature or temperature level resulting from or generated by the flow of current through any of a plurality of electrically conductive means employed to couple the load to the power source. A temperature controlled relay is included that is operable between a closed state or position, when the sensed temperature is below a predetermined limit temperature, and an open state or position when the sensed temperature is above the predetermined limit temperature. When in the closed state, or simply closed, the temperature controlled relay facilitates the coupling of the load to the power source, and when in the open state, or simply open, the relay electrically or effectively disconnects the load from the power source. It should be notes that when the temperature has risen above the predetermined limit temperature, an over-temperature event is said to have occurred.

The temperature controlled relay may be configured to cool when in the open state due to a loss of heating associated with an interruption of the flow of current. Accordingly, once the temperature controlled relay is of a temperature that is sufficiently below the predetermined limit temperature, the relay will 'automatically' re-assume the closed state thereby reconnecting the load to the power source. Alternately, the circuit interrupter may be configured to remain open until manually reset. Such resetting may be realized in a number of ways. A preferred embodiment may require the power source to be physically, or at minimum, effectively (electrically) disconnected from the circuit interrupter for a sufficient temporal period to effect suitable cooling. Once suitably cooled, the temperature controlled relay will reset (close), and the power source may again be coupled to the load via the circuit interrupter.

In a most preferred embodiment of the present invention a thermal conduction means is employed to thermally couple the temperature controlled relay to a plurality of electrically conductive means, which may include wires, plug prongs, socket blades, and the like. The thermal conduction means will enable heat produced by any of these electrically conductive means to be readily sensed by the temperature controlled relay. For example, thermal coupling may be provided by a volume of a suitable potting material (e.g., a thermally conductive potting epoxy), thermally conductive strips or tape, a volume a thermally conductive fluid or gel, and the like. Skilled persons may provide a number of adequate thermal coupling means, and arrangements thereof, in accordance with the requirements of the present invention.

Additionally, preferred embodiments may further include an indication means to indicate (or annunciate) to a nearby person when the load has been electrically disconnected from the power source as a result of a sensed temperature (as sensed by the temperature controlled relay) rising above the predetermined limit temperature.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIGS. 3A and 3B illustrate simplified schematic diagrams of two possible embodiments of the present invention.

LIST OF REFERENCE NUMERALS USED IN THE DRAWINGS

10—circuit interrupter
12—thermal relay assembly
12a—temperature controlled relay (single throw)
12aa—temperature controlled relay (double throw)
14—holding means
14a—resistive heating element (holding means)
16—indicator means (audio, visual, etc.)
16a—light emitting indicator
16b—audio sounder
20—power source
22—load
24—thermal conduction means
30—plurality of electrical conductors
32a—hot/source conductor (source side)
32b—hot/source conductor (load side)
34—neutral or return conductor
36—ground conductor

DETAILED DESCRIPTION OF THE PREFERRED EMBODIMENTS

It is important to establish the definition of a number of terms and expressions that are used throughout this disclosure The term 'load' may be assumed to be any electrical device or utensil that requires coupling to a power source in order to operate. Accordingly, the term 'power source' is intended to include any alternating current (AC) and or direct current (DC) source having sufficient power supplying capability to energize or adequately power the load. The term 'coupling', when referring to the connection of the load to the power source, is intended to indicate the establishing of the necessary electrical interconnects to enable the load to be powered or energized by the power source. Further, the expression 'disconnect the load from the power source' may indicate an actual disconnecting (via open contact(s) of a relay), or a significant reduction in the power delivered to the load. Accordingly, the disconnecting of the load and power source may result in zero power being delivered to the load, or alternately, a very low power level. As such, the term 'disconnected' is to be applied in a somewhat broad sense in the present disclosure. Finally, it should be understood that the relay may actually be provided as an electromechanical device, or equivalently as a solid-state (semiconductor) type of device. Therefore, when referring to an open state or position, the relay may be mechanically open (i.e., providing a near infinite resistance of an open circuit), or effectively open circuited (i.e., providing a very high, but not necessarily infinite resistance). Additional terms and expressions will be defined below, as required.

Figure 1:
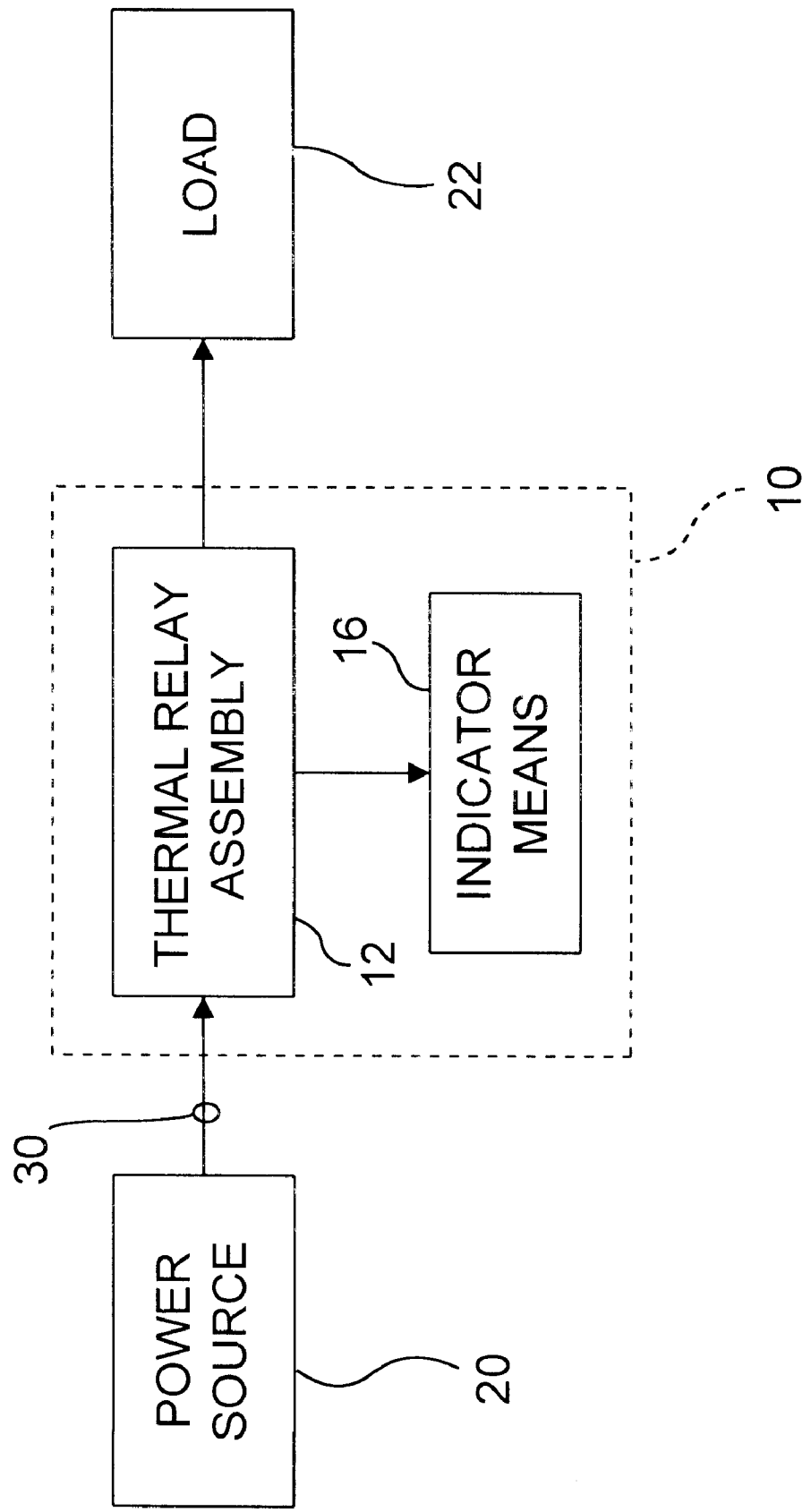
FIG. 1 provides a high level block diagram of an embodiment of the present invention.
Figure 2:
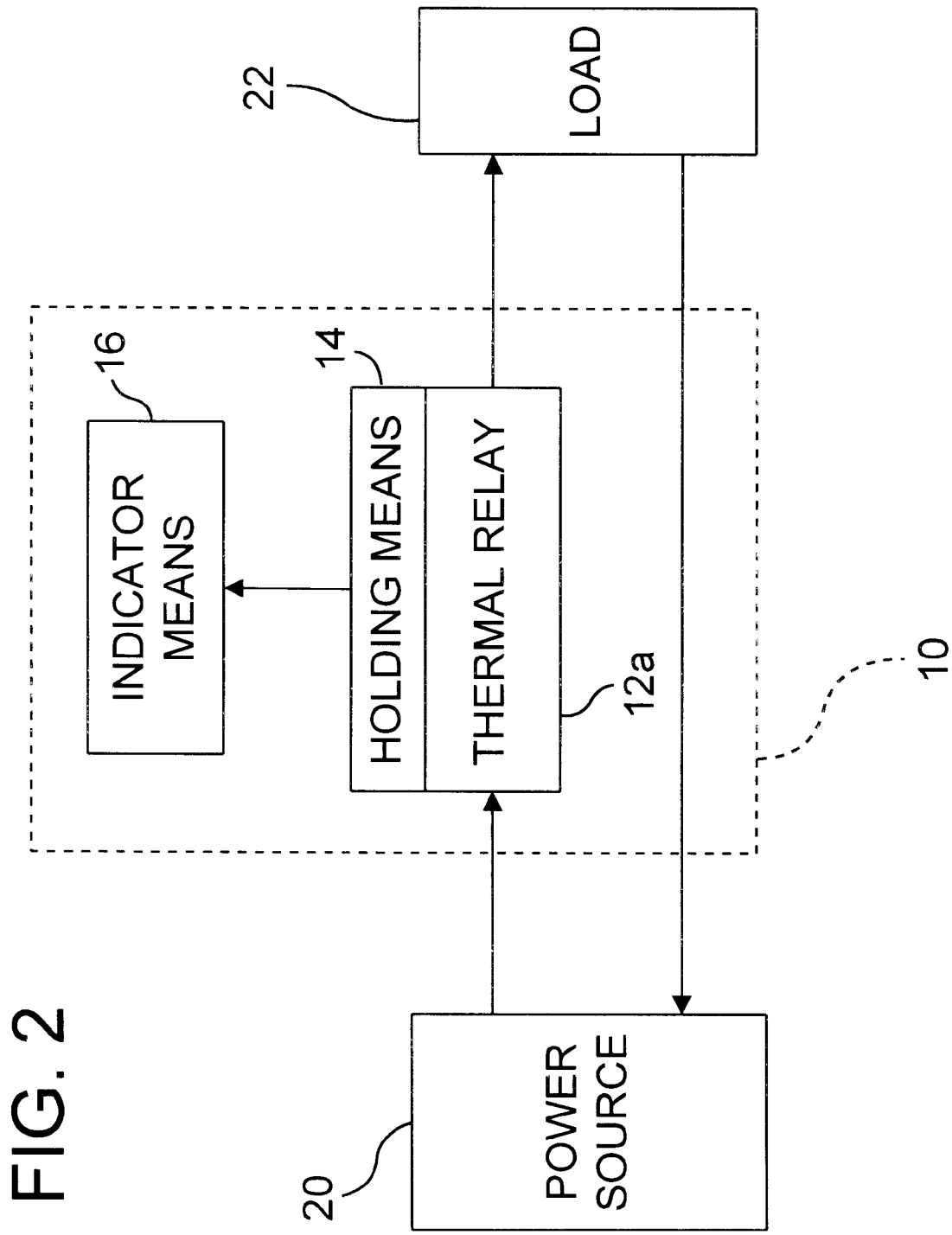
FIG. 2 provides a more detailed block diagram of an embodiment of the invention in accordance with FIG. 1.
Figure 3B:
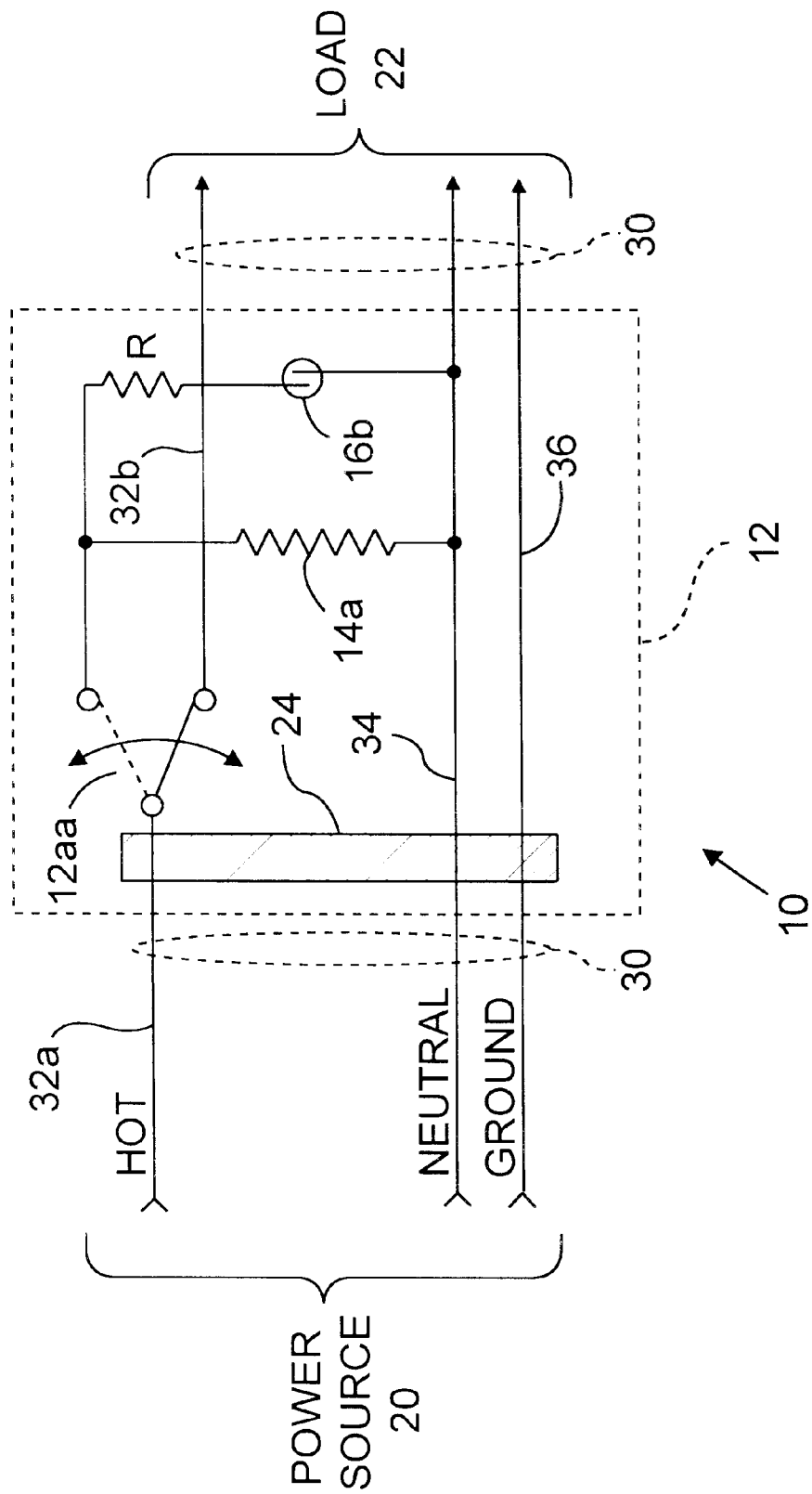

Turning now to FIG. 1, there is shown therein a high-level block diagram of an embodiment of a circuit interrupter 10 in accordance with the present invention. As can be clearly seen, the interrupter 10, which may be termed a heat sensing circuit interrupter or a temperature controlled circuit interrupter, is interposed in-line between a load 22 and a power source 20. Referring to FIGS. 3A and 3B, a plurality of current carrying conductors 30 connect the load 22 and power source 20. The current carrying conductors 30 include a hot conductor having a hot conductor source side 32a and a hot conductor load side 32b, a neutral conductor 34, and a ground conductor 36. The circuit interrupter 10 may preferably contain a thermal relay assembly 12 and an indicator means 16. The current carrying conductors 30 extend through the thermal relay assembly 12. The thermal relay assembly 12 includes as an important component a temperature controlled relay 12a (as best seen in FIGS. 2 and 3A). The temperature controlled relay 12a is configured to be sensitive to temperature. As such, when a sensed temperature (as sensed by the temperature controlled relay 12a) increases or rises above a predetermined limit temperature, the relay opens. Similarly, if the sensed temperature level is below the limit temperature, the relay 12a is closed. When closed or in a closed state the temperature controlled relay 12a enables the load 22 to be coupled to the power source 20 by connecting the hot conductor source side 32a with the hot conductor load side 32b (as seen in FIGS. 3A and 3B). When open, or in an open state, the temperature controlled relay 12a causes the load 22 to be effectively disconnected from the power source 20 by disconnecting the hot conductor load side 32b from the hot conductor source side 32a (as seen in FIGS. 3A and 3B). It should be noted that the predetermined limit temperature may actually be provided as a temperature limit 'pair' wherein the temperature controlled relay opens at a first temperature, and closes (again) at a second, possibly lower temperature, thereby possibly including a hysteresis characteristic.

It is important to realize that the source of heat sensed by the temperature controlled relay, such as relay 12a, which may result in an over-temperature event, may be caused by any of a number of circumstances or occurrences. Examples include poor contacts or connections, inadequate conductor gauge (i.e., not able to carry the required current to properly energize the load 22), or a malfunction of the load itself (causing excessive over-current flow therethrough).

As seen in FIG. 2, a preferred embodiment of the thermal relay assembly 12 may be comprised of a holding means 14, in addition to the temperature controlled relay 12a. The holding means 14 is included to hold the relay 12a in the open position, even when the heat source that caused the initial over-temperature event has been eliminated (or significantly reduced and allowed to cool). In a most preferred embodiment the relay 12a is returned to the closed position or closed state by a reset action. As skilled persons will appreciate, there are a number of suitable arrangements that may be provided to embody the holding means 14 of the present invention. Although specific embodiments and arrangements will be discussed, these should not be interpreted to be limiting or excluding other possible holding arrangements. Any suitable holding arrangement will simply hold the temperature controlled relay 12a in an open position until a reset action occurs.

One preferred holding arrangement is depicted in FIGS. 3A and 3B. As can be seen therein, the temperature controlled relay 12a is maintained in the open position by heat produced by a resistive heating element 14a, which is situated proximal to the relay 12a, and is energized when the temperature controlled relay 12a is in the open state. In the embodiment of FIG. 3A the resistive heating element 14a is arranged to shunt the relay 12a. As such, the resistive heating element depends on the load 22 to complete a circuit and cause a current flow thought the resistive heating element 14a. It should be noted that with this embodiment, the current that flows when the temperature controlled relay 12a is open is significantly lower than the current normally required to power the load 22.

A second arrangement, as illustrated in FIG. 3B, results in the power source 20 being (physically and electrically) disconnected in such a manner wherein virtually no current flows through the load 22. With this latter arrangement, the temperature controlled relay 12aa is configured in a single pole, double throw switching configuration. Accordingly, when in the closed position the load 22 is coupled to and energized by the power source 20. When in the open position, the power source 20 is coupled to the resistive heating element 14a to generate sufficient heat proximal to the temperature controlled relay 12aa. The heat generated by the resistive heating element. 14a must be sufficient to maintain the relay in the open position. Accordingly, when the holding means 14 is provided by the resistive heating element 14a configured as shown in FIG. 3B, a simple method may be employed to 'reset' the temperature controlled relay 12aa into the closed position. By simply disconnecting the power source 20 from the circuit interrupter 10 the temperature controlled relay 12aa is permitted to cool. Once the temperature controlled relay 12aa has returned to a temperature that is suitably below the predetermined limit temperature to reset the relay 12aa, the relay will re-assume the closed position. The power source 22 may then be reconnected to the circuit interrupter 10 to power the load 22.

In a possibly most preferred embodiment of the invention the temperature controlled relay 12a or 12aa is suitably situated proximal to each of the plurality of included current carrying means, such as electrically conductive wires, and the like, which are employed to couple the load 22 to the power source 20. It should be noted that the expression 'suitably positioned proximal to . . . ' will preferably result in the positioning of a portion of each of the current carrying means, such as the conductors 32a, 34 and 36, being located in a close proximity to said conductors, possibly adjacent to and or in contact with a covering or insulation of the conductors (not illustrated). For clarity, when generically referring to the conductors, they will be designated 'conductors 30'. The position of the temperature controlled relay 12a is important to facilitate the transfer of heat produced by a current flow through the conductors 30 to the relay 12a or 12aa. The inclusion of a thermal conduction means 24 to thermally couple the temperature controlled relay 12a (or 12aa) to a plurality of the electrically conductive means, including conductors 30, will enhance the transfer of heat to the relay 12a and the response of the relay 12a to an over-temperature event. An exemplary thermal conduction means 24 may be provided simply by 'air', or by a volume of a thermally conductive potting material, such as a thermal epoxy, as required to provide suitable thermal coupling. Other equivalent thermal conduction arrangements and means may be provided by skilled persons.

Another feature contemplated to be included with the present invention is an indication means 16. When an over-temperature event occurs and the temperature controlled relay 12a opens, the load 22 is disconnected from the power source 20. An indication or annunciation of this occurrence will be very helpful. For example, when an indication of the relay 12a being opened is not provided, individuals that notice the load 22 is not energized may attempt to 'fix' or correct the problem. This misguided effort may be frustrating, and possibly even dangerous. Accordingly, the inclusion of an indication means 16, which may be provided in a number of embodiments, will definitively indicate when the load has been electrically disconnected from the power source as a result of the sensed temperature rising above the predetermined limit temperature (possibly due to an over-current event). Further, the indication means may readily indicate to those familiar with the circuit interrupter 10, the need to disconnect the circuit interrupter from the power source 20 to enable the temperature controlled relay 12a (or 12aa) to cool and return to the closed state. Appropriate indicator 16 means 16 may be, for example, configured as shown in FIGS. 3A and 3B. In FIG. 3A, an audio indicator 16a is shown that may be energized via a voltage developed across the holding means 14 (exemplified by the resistive heating element 14a). This voltage is the result of relay 12a assuming the open position, and is reduced to near zero when the temperature controlled relay 12a is in the closed position. It may be noted that an audio or light emitting annunciation may be provided as either a continually or intermittently activated indicator means 16 (to alert nearby by persons).

Preferred embodiments of the present invention may further include additional types of display and indicator means 16, which may be configured to be readily observable by persons in the vicinity of the circuit interrupter 10. For example, a temperature indicating means may be included to enable an individual to note or monitor the temperature of circuit interrupter 10. Accordingly, as a function of the specific temperature determining components included, a housing temperature, the internal air temperature, or the temperature of the temperature controlled relay 12/12a, may be indicated. In a most preferred embodiment of the invention a chemical based 'bar-graph' kind of a temperature display may be included. Displays of this type are configured with a plurality of adjacent, typically independent, linearly arranged elements (e.g., an array) that provide a graduated scale for, in this case, temperature indication. Such a display may be provided to clearly indicate the approximate temperature of the circuit interrupter 10 (or a housing thereof). Bar-graph displays, as well as others suited to the invention, are well known to skilled persons. Other examples of display and indicator means may include one or more of a current (amp) meter, voltmeter, wattmeter, an over or under voltage annunciator, etc.

A possibly more preferred arrangement of components of the circuit interrupter 10 is illustrated in FIG. 3B. As discussed above, this arrangement results in the power source 20 being disconnected in such a manner that virtually no current flows through the load 22 when the relay 12aa is open. Instead, the series combination of resistor R and a light emitting indicator 16a are coupled to the power source 20 and energized. It should be understood that either an audio sounder 16a, a light emitting indicator 16b, and or other indicators may be employed with the present invention to embody the indication means 16.

As skilled persons will appreciate, and as clearly indicated in the references incorporated herein by reference (see above), the circuit interrupter 10 of the present invention may be physically embodied in a variety of forms. For example, the invention may be provided internal to an electrical device, or within an electrically conductive means coupling the load 22 to the power source 20. It is further contemplated that the invention may in a preferred embodiment be provided as an 'adapter' like device including a housing supporting a male plug and a female socket (e.g., a current tap), which is situated in-line with power coupling means. Yet other physical embodiments of the circuit interrupter 10 may be provided by skilled artisans in many forms and configurations in accordance with the present invention.

It is important to understand that the description of the embodiments of the circuit interrupter 10 of the present invention are illustrative only, and other equivalent arrangements are certainly possible. Therefore, while there have been described the currently preferred embodiments of the invention, those skilled in the art will recognize that other and further modifications may be made without departing from the present invention, and it is intended to claim all modifications and variations as fall within the scope of the appended claims.

What is claimed is:

1. A heat sensing circuit interrupter to enable a load to be selectively coupled to or disconnected from a power source in accordance with a level of a sensed temperature, the power source connected to the load with current carrying conductors including at least a hot conductor and a neutral conductor, the hot conductor having a hot conductor source side and a hot conductor load side, the circuit interrupter comprising:

a) a temperature controlled relay operable between a closed state when the sensed temperature is below a predetermined limit temperature, thereby enabling the coupling of the load to the power source by connecting the hot conductor source side and hot conductor load side, and an open state when the sensed temperature is above the predetermined limit temperature, thereby electrically disconnecting the load from the power source by disconnecting the hot conductor load side from the hot conductor source side;

b) the temperature controlled relay configurable to cool when in the open state due to a loss of heat resulting from an interruption of a flow of current through at least one of a plurality of electrically conductive means employed to couple the load to the power source, and once the temperature controlled relay is of a temperature that is below the predetermined limit temperature, the relay re-assumes the closed state thereby enabling reconnection of the load to the power source; and c) thermal conduction means employed to thermally couple the temperature controlled relay to the current carrying conductors to enable heat produced thereby to be sensed by the temperature controlled relay.

2. The circuit interrupter according to claim 1, wherein the circuit interrupter is configured to maintain the temperature controlled relay in the open state until the power source is electrically disconnected therefrom to enable cooling of the relay to a temperature below the predetermined limit temperature, so as to cause the temperature controlled relay to again assume the closed state.

3. The circuit interrupter according to claim 2, wherein the temperature controlled relay is maintained in the open state by heat produced by a resistive heating element proximal to the relay that is energized when the temperature controlled relay is in the open state.

4. The circuit interrupter according to claim 2, wherein the temperature controlled relay is suitably situated proximal to each of the plurality of current carrying conductors that are employed to couple the load to the power source, and wherein the plurality of current carrying conductors include a ground connector.

5. The circuit interrupter according to claim 4, wherein the thermal conduction means comprises, at least in part, a volume of a thermally conductive potting material employed to thermally couple at least a portion of each of a plurality of the current carrying conductors to the temperature controlled relay.

6. The circuit interrupter according to claim 5, wherein the potting material is provided by a thermal epoxy.

7. The circuit interrupter according to claim 1, further including an indication means to indicate when the load has been electrically disconnected from the power source as a result of the sensed temperature rising above the predetermined limit temperature.

8. The circuit interrupter according to claim 7, wherein the temperature controlled relay is maintained in the open state by heat produced by a resistive heating element proximal to the relay that is energized when the temperature controlled relay is in the open state, and wherein the indication means that indicates when the load has been disconnected from the power source further indicates the need to disconnect the circuit interrupter from the power source to enable the temperature controlled relay to cool and return to the closed state.

9. The circuit interrupter according to claim 8, wherein the indication means is provided by at least one of:

a) an audio sounder that emits an audio alarm, either continually or intermittently, to alert nearby persons; and b) a light emitting element that is observable by a nearby person.

10. A heat sensing circuit interrupter that is interposed between a load and a power source, and arranged to sense an increase in temperature, either directly or indirectly, by sensing heat produced by the flow of current through any of a plurality of current carrying conductors which couple the load to the power source, the current carrying conductors including a hot conductor and a neutral conductor, the circuit interrupter comprising:

a) a thermal relay assembly including a temperature controlled relay configured to close and enable the coupling of the load to the power source when a sensed temperature associated with at least one of the current carrying means is below a predetermined limit temperature, and open to disconnect the load from the power source by disconnecting-the hot conductor when the sensed temperature rises above the predetermined limit temperature, all current carrying conductors extending through the thermal relay assembly;

b) the thermal relay assembly configured to maintain the temperature controlled relay open with an occurrence of an over-temperature event until the power source is electrically disconnected from the thermal relay assembly to enable sufficient cooling thereof, at which point the temperature controlled relay will close; and c) thermal conduction means arranged to enable heat produced by any of the electrical current carrying conductors to be sensed by the temperature controlled relay.

11. The circuit interrupter according to claim 10, wherein the temperature controlled relay is suitably situated proximal to portion of each of a plurality of current carrying conductors composing, at least in part, the current carrying means, which are employed to couple the load to the power source to enable the relay to readily sense heat resulting from the flow of current through any of the current carrying means.

12. The circuit interrupter according to claim 11, wherein the temperature controlled relay is positioned immediately adjacent to a portion of each of the plurality of current carrying conductors.

13. The circuit interrupter according to claim 10, further including an indication means to indicate when the load has been disconnected from the power source as a result of the sensed temperature rising above the predetermined limit temperature, and to possibly further indicate the need to disconnect the power source from the temperature controlled relay to enable the temperature controlled relay to cool and close.

14. The circuit interrupter according to claim 10, wherein the thermal conduction means is provided by a material that is not electrically conductive.

15. The circuit interrupter according to claim 14, wherein the thermal conduction means is provided by air.

16. The circuit interrupter according to claim 10, wherein the thermal conduction means comprises a potting material that is employed to thermally couple at least a portion of each of the plurality of the current carrying conductors to the temperature controlled relay.

17. The circuit interrupter according to claim 16, wherein the thermal conduction material is provided by a thermal epoxy.

18. The circuit interrupter according to claim 10, wherein the temperature controlled relay is maintained open by heat produced by a resistive heating element proximal to the temperature controlled relay that is energized when the relay opens.

* * * * *